United States Patent
Virolainen et al.

(10) Patent No.: US 10,103,768 B2
(45) Date of Patent: Oct. 16, 2018

(54) MOBILE DEVICE CASING

(71) Applicant: Microsoft Technology Licensing, LLC, Redmond, WA (US)

(72) Inventors: Jussi Virolainen, Espoo (FI); Juha Ollikainen, Nastola (FI); Erkki Mikkonen, Vantaa (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 14/884,494

(22) Filed: Oct. 15, 2015

(65) Prior Publication Data
US 2017/0111075 A1    Apr. 20, 2017

(51) Int. Cl.
*A45C 11/00* (2006.01)
*H04B 1/3888* (2015.01)
*G03B 17/56* (2006.01)

(52) U.S. Cl.
CPC ......... *H04B 1/3888* (2013.01); *G03B 17/565* (2013.01); *A45C 2011/002* (2013.01)

(58) Field of Classification Search
CPC ........ A45C 2011/002; A45C 2011/003; H04B 1/3888
See application file for complete search history.

(56) References Cited

U.S. PATENT DOCUMENTS

| | | | |
|---|---|---|---|
| 8,226,306 B2 | 7/2012 | Chou | |
| 9,781,319 B2* | 10/2017 | Barros | H04N 5/2254 |
| 2013/0130753 A1 | 5/2013 | Springer | |
| 2013/0300919 A1 | 11/2013 | Fletcher et al. | |
| 2014/0198070 A1 | 7/2014 | Won | |
| 2014/0210803 A1 | 7/2014 | Oh et al. | |
| 2014/0268517 A1* | 9/2014 | Moon | H05K 7/00 361/679.01 |
| 2015/0057050 A1* | 2/2015 | Park | H04M 1/0243 455/566 |
| 2016/0205237 A1* | 7/2016 | Baek | H04M 1/72575 455/575.8 |

FOREIGN PATENT DOCUMENTS

| | | |
|---|---|---|
| CN | 203595887 U | 5/2014 |
| CN | 204180126 U | 2/2015 |
| WO | 2013090843 A1 | 6/2013 |

OTHER PUBLICATIONS

Sorrel, Charlie, "Gizmon's Clip-On Lenses Bring a Polarizer to the iPhone", Published on: May 25, 2012 Available at: http://www.cultofmac.com/169580/gizmons-clip-on-lenses-bring-a-polarizer-to-the-iphone/.

"Holga iPhone Lens", Published on: Jan. 7, 2012 Available at: http://photojojo.com/store/awesomeness/holga-iphone-lens/.

"USBfever Circular Polarizing Filter Lens (CPL) with Back Cover for iPhone 4 / iPhone 4S", Aug. 10, 2015 Available at: http://www.amazon.com/USBfever-Circular-Polarizing-Filter-iPhone/dp/B0089719C2.

(Continued)

*Primary Examiner* — Anthony Stashick
*Assistant Examiner* — Mollie Impink

(57) ABSTRACT

A casing comprising a flip cover, configured to encase at least a part of a mobile device having a camera, the flip cover comprising an optical filter located to enable image capturing by the camera through the optical filter.

15 Claims, 3 Drawing Sheets

(56) References Cited

OTHER PUBLICATIONS

"Samsung Galaxy S4 Circular Polarizer Filter Lens(CPL) Back Cover", Aug. 10, 2015 Available at: http://tanla.com.hk/index.php?main_page=product_info&cPath=228_219_222&products_id=1570.

"Jelly Camera Phone Filters", Published on: Dec. 4, 2009 Available at: http://photojojo.com/store/awesomeness/jelly-phone-filters/.

"Galaxy S6 S-View Flip Cover", Published on: Mar. 28, 2015 Available at: http://www.samsung.com/us/mobile/cell-phones-accessories/EF-CG920PBEGUS.

"Dream Scope: An IRL Filter Kit", Aug. 10, 2015 Available at: http://photojojo.com/store/awesomeness/dream-scope-irl-filter-kit/.

"Easy Macro Cell Lens Band", Aug. 10, 2015 Available at: http://photojojo.com/store/awesomeness/macro-lens-band/.

Phillips, et al., "Trygger Camera Case: iPhone 4/4S Polarizing Filter Case", Aug. 12, 2015 Available at: https://www.kickstarter.com/projects/trygger/trygger-camera-case-iphone-4-4s-polarizing-filter.

* cited by examiner

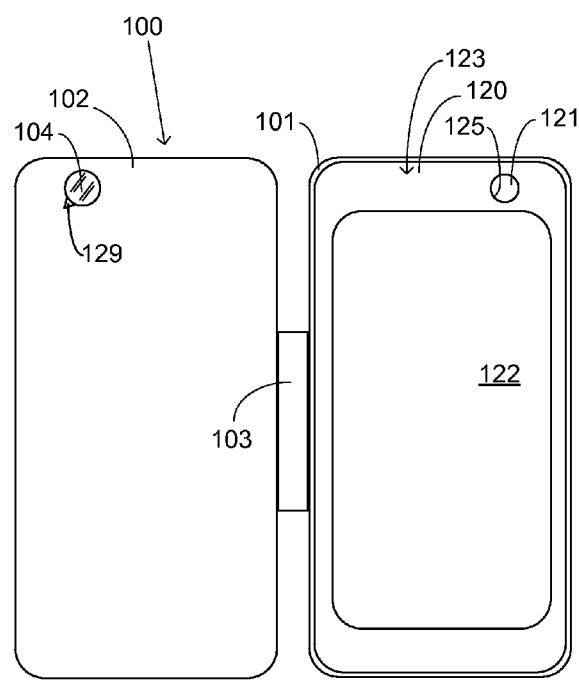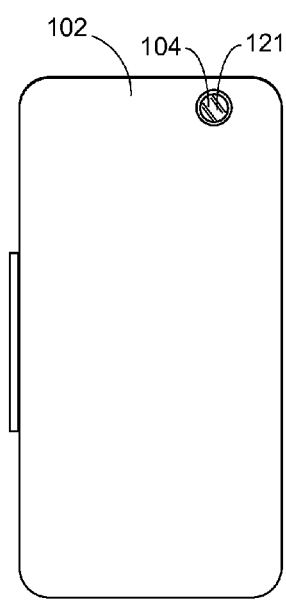
FIGURE 1A  FIGURE 1B
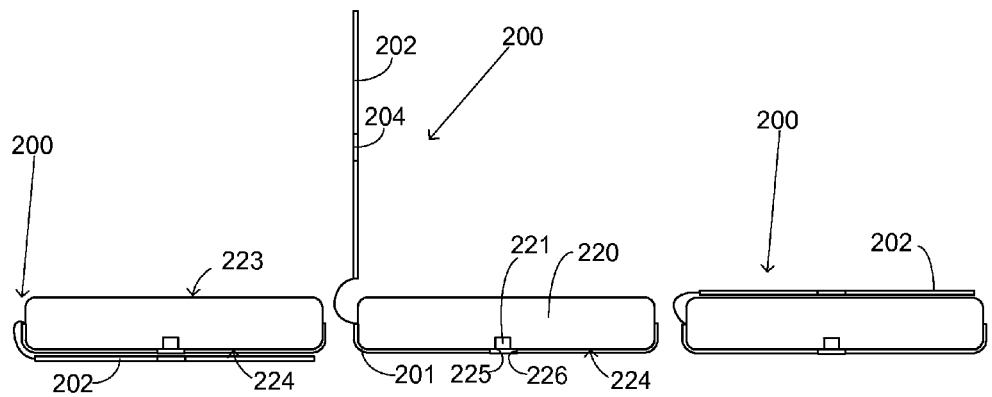
FIGURE 2A  FIGURE 2B  FIGURE 2C

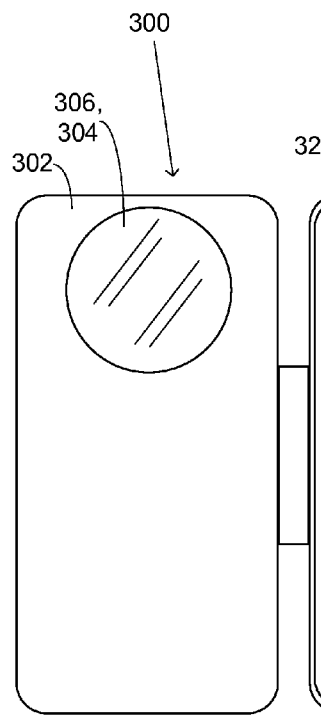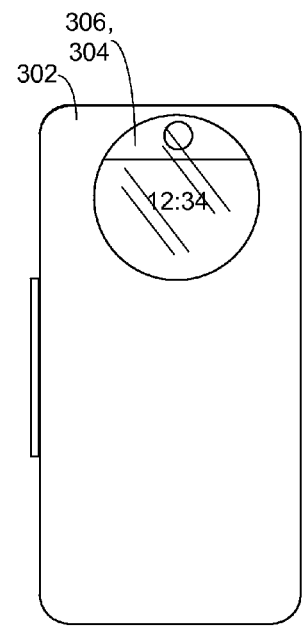
FIGURE 3A  FIGURE 3B
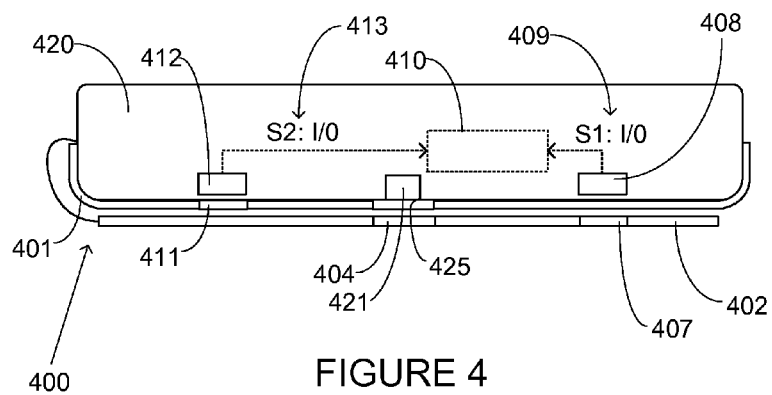
FIGURE 4

MOBILE DEVICE CASING

BACKGROUND

Digital cameras may be incorporated in various types of mobile devices. Such digital camera may be used to capture still images and/or videos comprising a plurality of sequential images.

The quality and properties of the captured images may be affected by use of various types of accessories.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A casing may be used in connection with a mobile device having a camera. The casing may comprise a flip cover and it may be configured to encase at least a part of the mobile device. The flip cover may comprise an optical filter located to enable image capturing by the camera through the optical filter.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIGS. 1A and 1B illustrate a casing attached to a mobile device as a front view;

FIGS. 2A to 2C illustrate a casing attached to a mobile device as a sectional view;

FIGS. 3A and 3B illustrate a casing attached to a mobile device as a front view;

FIG. 4 illustrates a casing attached to a mobile device as a sectional view;

Figure 5:
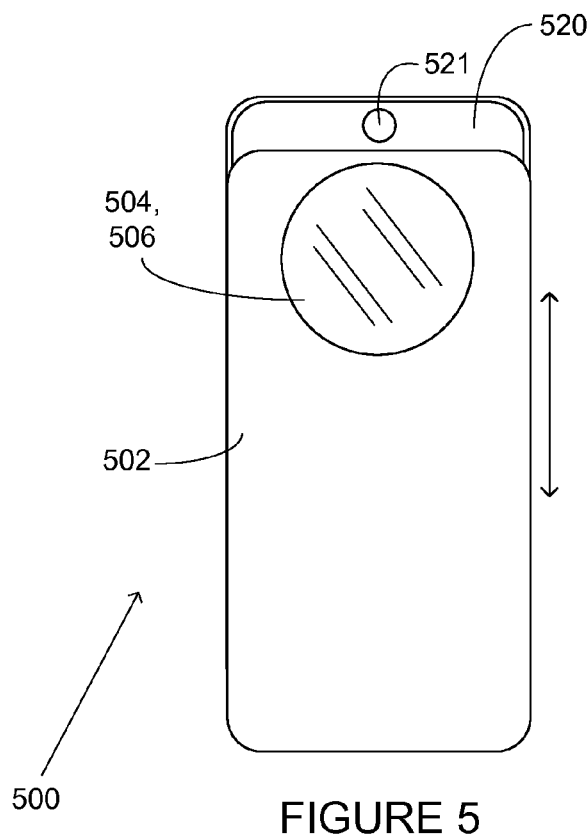
FIG. 5 illustrates a casing attached to a mobile device as a front view.

The drawings of the FIGs. are not necessarily to scale.

DETAILED DESCRIPTION

The detailed description provided below in connection with the appended drawings is intended as a description of a number of embodiments and is not intended to represent the only forms in which the embodiments may be constructed, implemented, or utilized.

The drawings of the FIGs. represent the principles of embodiments, especially the structural details, schematically. Structural details of the devices and elements, as well as materials thereof, may be implemented and selected in any appropriate manner.

The casing 100 of FIGS. 1A and 1B may be used to encase at least partially a mobile device which has a camera. In FIGS. 1A and 1B, the casing is illustrated as being mounted or attached to a mobile device 120. Thereby, the casing 100 and the mobile device 120 are coupled to each other.

A "camera" refers to a device, module, unit, or element comprising at least an image sensor capable of capturing digital image frames comprising image data on the basis of which digital images may be reproduced and displayed. A "camera" may be implemented, for example, as a plain digital image sensor which is connected to appropriate external power supply and control unit(s) and equipped with appropriate housing and an optical system. In another embodiment, a camera may be implemented as an imaging module or camera module which itself may comprise, in addition to the actual digital image sensor element, also any appropriate mechanical and optical elements as well as control electronics.

A "mobile device" may be a mobile electronic device of any type having at least one camera. Such mobile device may be, for example, a tablet computer, a phablet, a smartphone or a mobile phone, a game console, a wearable device, etc.

The mobile device 120 of FIG. 1 has a camera 121 and a display 122. The camera has its viewing direction directed out of the side of the mobile device on which side the display lies. The display thereby emits light, when in use, to the same side, i.e. to the front side 123, of the mobile device from which side the camera receives light when capturing images. The camera 121 may thus be called a "front camera" or a "front facing camera" lying on the front side of the mobile device 120. "Lying on the front side" refers to the viewing direction of the camera, without limiting the physical location of the camera in the direction of the thickness of the mobile device.

Light can enter the image sensor of the camera through an aperture 125 in the mobile device outer shell or housing. The aperture may be formed, for example, as an opening in a housing of the mobile device, covered by a transparent glass or plastic plate or lens.

The casing 100 comprises a body part 101 and a flip cover 102 connected via a flexible and/or resilient connecting member 103. The casing is attached to the mobile device 120 via the body part 101.

In another embodiment, a casing may be implemented as having no separate body part. In such embodiment, a flip cover of the casing may be mountable to a mobile device e.g. via a connecting member corresponding to that of FIGS. 1A and 1B.

A "flip cover" refers to a cover part of a casing, which can be turnably set in different positions. As illustrated in FIG. 1B, it may lie in a front position where the flip cover lies on or against the front side 123 and the display 122 of the mobile device 120 to which the casing, when in use, is coupled. A flip cover may also be in an open position, one example being illustrated in FIG. 1A, wherein the flip cover 102 is turned so that the front side of the mobile device 123 may be accessible and visible. A flip cover may also be turnable to a back position where it lies on or against a back side of a mobile device to which it is attached.

The flip cover 102 of the casing 100 of FIGS. 1A and 1B comprises an optical filter 104. The optical filter 104 is located so that with the flip cover 102 in its front position, the optical filter and the camera 121 of the mobile device to which the casing is mounted are substantially aligned with each other. Then, light incident on the optical filter 104 may be transmitted through the optical filter to the camera 121. Then, images may be captured by the camera 121 through the optical filter 104.

An "optical filter" refers to any type of optical element which is at least partially transparent so that at least part of light incident on the optical filter may be transmitted through the optical filter, and which affects at least one of the spectrum and the polarization state of such light incident on and propagating through the optical filter. The optical filter may be transparent at the visible wavelength range or at any other appropriate wavelength range. For example, in the case of an infrared camera, the transparency may refer to transparency at an infrared wavelength range. The optical filter may be, for example, a color filter, a bandpass filter, a neutral density (ND) filter, an infrared (IR) filter, or an imaging filter of any other appropriate type.

In the embodiment of FIGS. 1A and 1B, the optical filter is a polarization filter selectively transmitting the incident light on the basis of its polarization state. The polarization filter may be, for example, a linear polarization filter transmitting linearly polarized light, a circular polarization filter producing circularly polarized transmitted light, or a cross polarization filter changing the polarization orientation of incident, linearly polarized light perpendicular to the initial orientation. There can be also two or more linear polarization filters, with their polarization orientations being at an angle relative to each other.

The polarization filter of the flip cover 102 may affect the quality of images captured by the camera of the mobile device through the polarization filter. For example, the polarization filter may reduce the portion of reflected light in the light transmitted through the polarization filter in comparison to the incident light. Thereby, glare may be reduced in the captured images.

The location of the optical filter 104 in the flip cover 102 may advantageously allow the user of a mobile device to which the casing 100 is attached to select whether to use the optical filter 104 or not when capturing images, simply by turning the flip cover to an appropriate position.

The polarization filter as the optical filter 104 of the flip cover 101 may be mounted to the flip cover so as to be rotatable. Rotating refers to rotating in the plane of the filter, i.e. around a fictitious rotating axis lying perpendicularly relative to the plane in which the filter extends. By rotating the filter, the polarization state(s) of incident light which are blocked or attenuated by the polarization filter may be adjusted.

In the case of rotatably mounting of the optical filter 102, the casing may comprise an indicator 129 configured to indicate the rotational position of the filter. Thereby, the user of the casing may know the selected polarization orientation of the light transmitted by the optical filter 102.

The position of the optical filter 104 close to an edge of the flip cover, corresponding to the position of the camera 121 close to an edge of the mobile device 120, is an example only. In other embodiments, the location of the camera and the optical filter may be different. For example, they may be located substantially at the center line of the mobile device and the flip cover, respectively.

The casing 200 of FIGS. 2A to 2C is attached to a mobile device 220, the casing and the mobile device being illustrated as a simplified sectional view. The body part 201 of the casing 200 forms a support part lying against the back side of the mobile device 220.

The mobile device 220 differs from that of FIGS. 1A and 1B in that, instead of a front facing camera, it has a back facing camera or a back camera, i.e. a camera 221 having a field of view directed out of the back side 224 of the mobile device 220. The camera 221 thereby "lies on the back side 224" of the mobile device. Further, instead of being close to an edge of the mobile device, the camera 221 is located, in a lateral direction, at the center of the mobile device. Naturally, this is one example only; in other embodiments, the camera may lie in different locations.

In the casing 200 of FIGS. 2A to 2C, the body part 201 lying against the mobile phone 220 on the back side thereof has an opening 226 located to allow the camera 221 to receive light from the outside of the mobile device.

The flip cover 202 of the casing 200 of FIGS. 2A to 2C may be turned to a front position where the flip cover lies on or against the front side 223 of the mobile device, as illustrated in FIG. 2C, and to a back position, as illustrated in FIG. 2A, where the flip cover lies on or against the back side 224 of the mobile device. It may also be turned to any open position between these two extreme positions, one example being illustrated in FIG. 2B.

With the flip cover 202 in the back position, the optical filter 204 is located, similarly with the casing of FIGS. 1A and 1B, so that the optical filter 204 and the camera 221 of the mobile device 220 to which the casing 200 is attached are substantially aligned with each other, allowing capturing images by the camera through the optical filter. In the embodiment of FIGS. 2A to 2C, this means that the casing of FIGS. 2A to 2C differs from that of FIGS. 1A and 1B in that the optical filter 204 is located, in a lateral direction, substantially at the center of the flip cover 202.

In the casings 100, 200 of FIGS. 1A, 1B, and 2A to 2C, the optical filter 104, 204 has a size slightly larger than the aperture 125, 225 through which light can enter the camera and the imaging sensor thereof. In other embodiments, a filter may be smaller or more clearly larger than such aperture.

The casing 300 of FIGS. 3A and 3B differ from that of FIGS. 1A and 1B in that instead of an optical filter with a size close to the size of the aperture 325 through which light can enter the camera 321, the flip cover 302 has a window 306 with a size clearly exceeding the size of the aperture 325.

A "window" refers to an optical element which is at least partially transparent in the visible wavelength range so that at least part of visible light incident on the window may be transmitted through it. A window may be formed, for example, of a plastic or glass material.

The window 306 comprises an optical filter 304. The optical filter may be incorporated in the window, for example, as one or more filter layers attached to a plastic or glass plate forming a window body. In another embodiment, the entire window may serve for the filtering function of the optical filter.

The window 306 is located in the flip cover 302 so that with the flip cover 302 in the front position thereof, as illustrated in FIG. 3B, the area of the window 306 covers the aperture 325 and a part of the display 322 of the mobile device 320 to which the casing 300 is attached or mounted. Thereby, the window 306 transmits visible light emitted by the part of the display 322 covered by the area of the window. Then, the user of the mobile device can observe the display which may present information to the user also when the flip cover is in the front position. The window 306 and the optical filter 304 thereof also transmits visible light incident on the window from the outside of the mobile device 320 to the image sensor of the camera 321.

Similarly to the polarization filter 104 of the casing 100 of FIGS. 1A and 1B, the window 306 may be rotatably mounted to the flip cover.

The principle illustrated in FIGS. 3A and 3B of a window which also serves as an optical filter for the mobile device camera may be utilized also in a casing for a mobile device having the camera on its back side, similarly to the embodiment illustrated in FIGS. 2A to 2C.

In addition to a polarization filter and/or any other optical filter type useful in image capturing, the window 306 may also be configured to affect the display performance. For example, there may be layer(s) or element(s) in the window serving, for example, as a privacy filter limiting the maximum possible viewing angle in which the displayed information is visible, and/or for reducing undesired glare from the window.

In the casings 100, 200, 300 of FIGS. 1A and 1B, 2A to 2C, and 3A and 3B, the optical filter 104, 204 as well as the window 306 with the optical filter 304 are circular. This may simplify the mounting construction between the filter or the window and the flip cover 102, 202, 302 particularly in the case of rotatable mounting of the filter or the window. In other embodiments, also other shapes such as a rectangular or a square are possible.

In the casings 100, 200, 300 of FIGS. 1A and 1B, 2A to 2C, and 3A and 3B, the optical filter 104, 204 as well as the window 306 with the optical filter 304 may be releasably mounted to the flip cover. A releasably mounting may enable replacement of the optical filter or the window by another optical filter or window, possibly having different optical performance. This may allow the user of the casing to select an appropriate optical filter according to the present conditions. As one example, a solar filter may be used for imaging solar eclipse.

It may be useful if the camera of a mobile device to which a casing is mounted is controlled appropriately in accordance with the used optical filter type. FIG. 4 illustrates a simplified sectional view of a casing 400 releasably attached, i.e. coupled, to a mobile device 420. The mobile device and the casing may be in accordance with those of FIGS. 2A to 2C.

The flip cover 402 of the casing 400 comprises a first magnet 407. The mobile device 420 comprises a corresponding first magnetic field sensor 408 located, with the flip cover 402 in the back position, substantially aligned with the first magnet 407.

The first magnet 407 serves as a first sensor element. The first magnet and the first magnetic field sensor 408 form parts of a first magnetic sensing arrangement. The first magnetic field sensor 408 detects, when in use, the magnetic field produced by the first magnet 407 and produces a position signal 409 dependent on the presence of the first magnet in the proximity of the first magnetic field sensor. Thereby, the first magnetic sensing arrangement serves as a position sensing arrangement which produces, when in use, a position signal 409 which is dependent on the position of the flip cover 402.

The mobile device 420 comprises a processing unit 410 which is connected to the first magnetic sensing arrangement by any wired or wireless communication arrangement and equipment and receives, when in use, the position signal 409. The processing unit determines, when in use, on the basis of the position signal, the position of the flip cover 402, particularly whether the flip cover is in its back position, and whether the optical filter 404 thereof lies thereby in front of the camera aperture 425.

Information about the determined position of the flip cover 402 may be further used to control the camera 420 appropriately. This controlling may comprise selecting one or more operational parameters of the camera differently when the flip cover is in the back position and when it is in another position. Thereby, the presence of the optical filter 404 in front of the camera aperture 425 may be taken into account in the operation of the camera 420 in an optimal manner.

One example of such operational parameters of the camera is the exposure time which may be selected according to the illumination conditions. An optical filter, such as a polarization filter, may absorb part of the incident light thereon, thereby reducing the light power or intensity received by the camera. This reduction may be compensated by increasing the exposure time in comparison to a situation with corresponding illumination conditions but without the filter of the flip cover lying in front of the camera.

The casing 400 further comprises a second magnet 411 located in the body part 401 of the mobile device 420. The mobile device 420 comprises a corresponding second magnetic field sensor 412 located substantially aligned with the second magnet 411.

The second magnet 411 serves as a second sensor element. The second magnet 411 and the second magnetic field sensor 412 form parts of a second magnetic sensing arrangement. The second magnetic field sensor 412 detects, when in use, the magnetic field produced by the second magnet 411 and produces a presence signal 413 dependent on the presence of the second magnet 411 in the proximity of the second magnetic field sensor 412. Thereby, the second magnetic sensing arrangement serves as a presence sensing arrangement which produces, when in use, a presence signal 413 which is dependent on the presence of the casing 400 in the proximity of the mobile device 420.

The processing unit 410 is connected to the second magnetic sensing arrangement by any wired or wireless communication arrangement and equipment and receives, when in use, the presence signal 413, and determines on the basis of the presence signal the presence of the casing 400, particularly whether the casing is mounted to the mobile device 420.

The processing unit may determine the presence of the casing 400, for example, on the basis of a threshold level of the magnetic field strength detected by the second magnetic field sensor 412. Given the strength of the second magnet 411, such threshold value may be predetermined so as to correspond to specific maximum distance of the second magnet 411 from the second magnetic field sensor.

The position signal 409 may comprise, for example, on/off type indication about whether magnetic field strength detected by the first magnetic field sensor 408 exceeds a predetermined threshold value, indicating the presence of the first magnet 407 within a predetermined distance from the first magnetic sensor 408. Similarly, the presence signal 413 may comprise, for example, on/off type indication about whether magnetic field strength detected by the second magnetic field sensor 412 exceeds a corresponding predetermined threshold value, indicating the presence of the second magnet 411 within a predetermined distance from the second magnetic sensor 412.

A plurality of casings may be provided, each having a specific filter type and a second magnet with a strength which is selected according to the filter type at issue. Then the strength of the second magnet 411 may indicate the type of the optical filter 404. The processing unit may then produce or generate the presence signal 413 so that it depends on, i.e. contains information about, the strength of the second magnet 411, and therefore also about the filter type. Then, in addition to determining whether the casing 400 is present and mounted to the mobile device 420, the processing unit may further determine the type of the optical filter on the basis of the strength of the second magnet 411.

Instead of one single second magnetic sensing arrangement detecting both the presence of the casing 400 and the strength of the second magnet 411, separate sensing arrangements may be provided for first detecting the presence of a casing on the basis of one magnet in the casing, and then sensing the strength of another magnet indicating the optical filter type. Thereby, it may be possible to avoid erroneous filter type determination on the basis of a magnetic field produced by a magnet in a casing which is not properly attached to the mobile device.

Information about the determined presence of the casing 400 and the type of the optical filter 404 may be further used, together with the information about the determined position of the flip cover 402, to control the camera 420 appropriately. This controlling may comprise selecting one or more operational parameters of the camera differently when the flip cover is in the back position and when it is in another position, taking also into account the filter type of the casing 400. Thereby, the presence of that particular type of optical filter 404 in front of the camera aperture 425 may be taken into account in the operation of the camera 420 in an optimal manner.

With regard to the operations carried out by the processing unit 410, there are various possibilities for the processing unit to be configured to perform those operations. For example, the processing unit may comprise at least one processor and at least one memory coupled to the at least one processor, the memory storing program code instructions which, when run on the at least one processor, cause the processor to perform the operation(s) or action(s) at issue. Alternatively, or additionally, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The processing unit may be a separate unit specifically designed for the above operations. Alternatively, it may be a common processing unit of the apparatus also performing other operations and actions. The processing unit may be divided into two or more sub-units with separate purposes.

Although the first and the second sensing systems and the camera 421 of the FIG. are illustrated in a single sectional view, those sensing elements and camera 421 does not necessarily lie in a single cross-sectional plane of the casing 400 and the mobile device 420.

The principle of sensing arrangements to determine the position of the flip cover may be utilized also in embodiments where the camera is a front facing camera, such as the embodiments illustrated in FIGS. 1A and 1B, 2A to 2C, and 3A and 3B. Then, the locations of the magnets and sensing elements may be selected differently from the embodiment of FIG. 4 to enable the desired sensing operation(s).

In the case of a mobile device with both a front facing camera and a back side camera, there may be one position sensing arrangement configured to detect when the flip cover is in the front position, and another configured to detect when the flip cover is in the back position.

Instead of magnetic sensing arrangements, position sensing arrangement(s) and/or presence sensing arrangement(s) may be based on some other sensing technology, such as Radio Frequency Identification RFID or Near Field Communication NFC.

In the case of rotatable mounting of the optical filter to the casing, the casing may have one or more sensor elements forming parts(s) (not shown in the FIGS.) of a filter rotational position sensing arrangement configured to produce a filter rotational position signal dependent on the rotational position of the optical filter. Such signal may be used as a basis for determining the rotational position of the optical filter. Information about the determined rotational position may be used, for example, to adjust operational parameter(s) of the camera of the mobile device to which the casing is mounted and/or to show the determined rotational position of the optical filter to the user of the casing and the mobile device.

The casing 500 of FIG. 5 differs from that of FIGS. 3A and 3B in that instead of a flip cover, the casing has a slide cover 502 slidably coupled to the body part 501. A window 506 having an optical filter 504, similar to that of the casing 300 of FIGS. 3A and 3B, is mounted to the slide cover, possibly rotatably and/or releasably.

The slide cover 502 may allow the user of the casing 500 and the mobile device 520 to which the casing is mounted to select whether to use the optical filter in front of the camera 521 during imaging by sliding the slide cover 502 to an appropriate position.

The casing and the mobile device of FIG. 5 may comprise sensing arrangement(s) similar to those illustrated and discussed above with reference to FIG. 4.

In each of the embodiments illustrated in FIGS. 1A and 1B, 2A to 2C, 3A and 3B, 4, and 5, the mobile device 120, 220, 320, 420, 520 and the casing 100, 200, 300, 400, 500 mounted or attached to the mobile device form parts of an apparatus.

Each of the casings 100, 200, 300, 400, 500 of the apparatuses of FIGS. 1A and 1B, 2A to 2C, 3A and 3B, 4, and 5 may be implemented as a replaceable accessory casing to be coupled to a mobile device by releasable mounting. Then, the mobile device may have an outer housing on or against which the accessory casing lies when coupled, i.e. attached, to the mobile device.

Alternatively, in each of the apparatuses of FIGS. 1A and 1B, 2A to 2C, 3A and 3B, 4, and 5, the mobile device 120, 220, 320, 420, 520 may have an outer housing, at least part of which the casing 100, 200, 300, 400, 500 forms when attached to the mobile device. Then, the casing is a part of the mobile device.

A casing forming a part of an outer housing of a mobile device may be, similarly to an accessory casing, removably and replaceably attachable to the mobile device.

Figure 6:
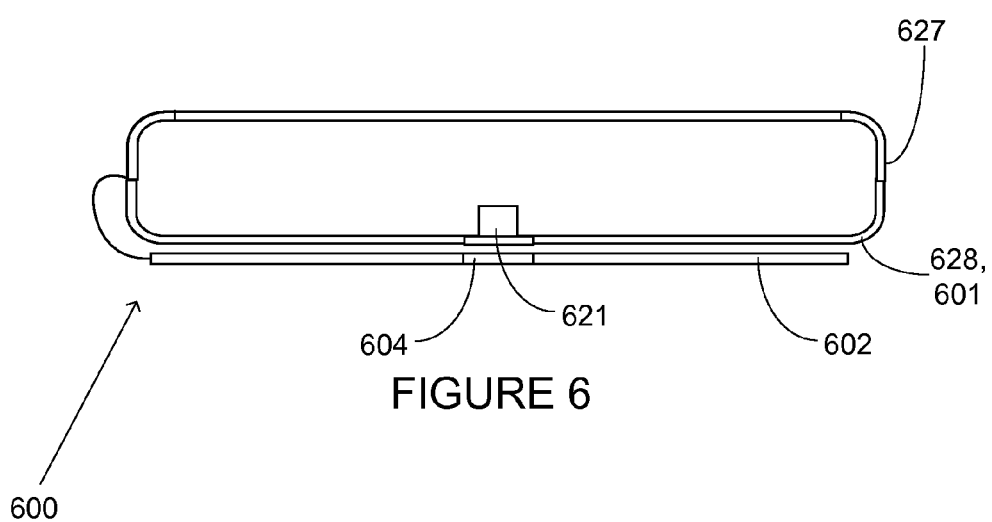
FIG. 6 illustrates a casing attached to a mobile device as a sectional view.

The casing 600 of FIG. 6, which may be in accordance with the casing 200 of FIGS. 2A to 2C is illustrated with the flip cover 602 in the back position. The casing 600 is an example of a casing forming a part of an outer housing of a mobile device.

The mobile device 620 of FIG. 6 comprises an outer housing 627 forming an outer, protective shell enclosing the functional parts of the mobile device. The outer housing has a back cover 628 formed by the body part 601 of the casing 600. The back cover 628 may be releasably mounted to the rest of the mobile device 620.

In FIGS. 1A and 1B, 2A to 2C, 3A and 3B, 4, 5, and 6, one single camera 121, 221, 321, 421, 521, 621 is illustrated as being incorporated in the mobile device 100, 200, 300, 400, 500, 600. However, in each of those embodiments, the mobile device may also have two or more cameras. For example, a mobile device may incorporate both a front camera and a back camera. Then, in the case of the optical filter 104, 204, 304, 404, 604 being incorporated in a flip cover 102, 202, 302, 402, 602, the optical filter may be shaped, dimensioned, and located so that it may be positioned in front of one or both of those cameras.

Further, there can be two or more cameras on the same side of the mobile device. For example, a mobile device may have an ordinary front camera for imaging purposes and another front facing camera for some specific purpose, such as an iris camera for iris recognition. Also in the case of two cameras lying on the same side of the mobile device, the optical filter 104, 204, 304, 404, 504, 604 may be shaped, dimensioned, and located so that it may be positioned in front of one or both of those cameras.

Some embodiments are further discussed shortly in the following.

According to a first aspect, a casing may comprise a flip cover and be configured to encase at least a part of a mobile device having a camera, the flip cover comprising an optical filter located to enable image capturing by the camera through the optical filter.

In an embodiment, the optical filter is a polarization filter.

In an embodiment in accordance with the preceding embodiment, the polarization filter is rotatably mounted to the flip cover. In an embodiment with a rotatably mounted polarization filter, the casing comprises an indicator configured to indicate the rotational position of the polarization filter.

In an embodiment which may be in accordance with any of the preceding embodiments, the optical filter is releasably mounted to the flip cover.

In an embodiment which may be in accordance with any of the preceding embodiments, the mobile device has a front side and a back side, the flip cover being turnable between a front position with the flip cover lying on front side of the mobile device and a back position with the flip cover lying on the back side of the mobile device.

In an embodiment in accordance with the preceding embodiment, the flip cover comprises a first sensor element configured to form a part of a position sensing arrangement configured to produce a position signal dependent on the position of the flip cover.

In an embodiment in accordance with the preceding embodiment, the position sensing arrangement comprises a first magnetic sensing arrangement, and the first sensor element comprises a first magnet configured to form a part of the first magnetic sensing arrangement.

In an embodiment which may be in accordance with any of the preceding three embodiments, the mobile device has a display on the front side of the mobile device, the optical filter being shaped and located to enable, with the flip cover in the front position, observation of at least part of the display through the optical filter.

In an embodiment which may be in accordance with any of the preceding four embodiments, the camera lies on the back side of the mobile device.

In an embodiment which may be in accordance with any of the preceding embodiments, the mobile device has an outer housing, the casing forming a part of the outer housing of the mobile device.

According to a second aspect, a casing may be configured to encase at least a part of a mobile device having an image sensor and a display, the casing comprising a window configured to transmit light emitted by the display, the window comprising an optical filter shaped and located to transmit light incident on the window to the image sensor.

In an embodiment, the optical filter is a polarization filter.

In an embodiment in accordance with the preceding embodiment, the polarization filter is rotatably mounted to the casing.

In an embodiment which may be in accordance with any of the preceding embodiments of the second aspect, the optical filter is releasably mounted to the casing.

In an embodiment which may be in accordance with any of the preceding embodiments of the second aspect, the casing comprises a flip cover, the window being located in the flip cover.

In an embodiment which may be in accordance with any of the preceding embodiments of the second aspect, the mobile device has a front side and a back side, the display lying on the front side of the mobile device and the image sensor lying on the back side of the mobile device, the flip cover being turnable between a front position with the flip cover lying on the front side of the mobile device and a back position with the flip cover lying on the back side of the mobile device.

According to a third aspect, an apparatus may comprise a mobile device having a camera, the apparatus comprising a casing comprising a flip cover, the casing being configured to encase at least a part of the mobile device, the flip cover comprising an optical filter located to enable image capturing by the camera through the optical filter. The casing of the apparatus may be a casing in accordance with any of the above embodiments of the first aspect, configured to encase at least a part of the mobile device, the flip cover comprising an optical filter located to enable image capturing by the camera through the optical filter.

In an embodiment, the casing is an accessory casing releasably coupled to the mobile device.

In an alternative embodiment, the mobile device has an outer housing, the casing forming a part of the outer housing of the mobile device. The casing forming a part of the outer housing of the mobile device may be releasably mounted to the rest of the mobile device.

In an embodiment which may be in accordance with any of the preceding embodiments of the third aspect, the apparatus further comprises a presence sensing arrangement configured to produce a presence signal dependent on the presence of the casing, the mobile device comprising a processing unit connected to the presence sensing arrangement to receive the presence signal and configured to determine the presence of the casing on the basis of the presence signal.

In an embodiment in accordance with the preceding embodiment, the presence sensing arrangement comprises a second magnetic sensing arrangement comprising a second magnet, having a strength and being located in the casing, the presence sensing arrangement being configured to produce the presence signal so as to be proportional to the strength of the second magnet.

Although some of the present embodiments may be described and illustrated herein as being implemented in a smartphone, a mobile phone, or a tablet computer, these are only examples of a device and not a limitation. As those skilled in the art will appreciate, the present embodiments are suitable for application in a variety of different types of mobile devices, such as game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term "comprising" is used in this specification to mean including the features followed thereafter, without excluding the presence of one or more additional features.

The invention claimed is:

1. A mobile device and casing comprising:
a flip cover, configured to encase at least a part of the mobile device having a camera, the flip cover comprising:
an optical filter located to enable image capturing by the camera through the optical filter; and
a magnet having a strength indicating, to a processing unit of the mobile device, a type of the optical filter.

2. A mobile device and casing as defined in claim 1, wherein the optical filter is a polarization filter.

3. A mobile device and casing as defined in claim 2, wherein the polarization filter is rotatably mounted to the flip cover, the flip cover further comprising an indicator configured to indicate a rotational position of the polarization filter.

4. A mobile device and casing as defined in claim 1, wherein the mobile device has a front side and a back side, the flip cover being turnable between a front position with the flip cover on the front side of the mobile device and a back position with the flip cover on the back side of the mobile device.

5. A mobile device and casing as defined in claim 4, wherein the mobile device has a display on the front side of the mobile device, the optical filter being shaped and located to enable, with the flip cover in the front position, observation of at least part of the display through the optical filter.

6. A mobile device and casing as defined in claim 4, wherein the camera is on the back side of the mobile device.

7. A mobile device and casing as defined in claim 4, further comprising a magnetic sensor wherein the magnet and the magnetic sensor form a magnetic sensing arrangement configured to produce a presence signal when the flip cover is on the back side of the mobile device.

8. A mobile device and casing as defined in claim 7, further comprising the processing unit connected to the magnetic sensing arrangement to receive the presence signal and configured to determine whether the flip cover is on the back side of the mobile device.

9. A mobile device and casing as defined in claim 7, further comprising the processing unit connected to the magnetic sensing arrangement to receive the presence signal and configured to select one or more operational parameters of the camera when the flip cover is on the back side of the mobile device.

10. A mobile device and casing as defined in claim 1, wherein the mobile device has an outer housing, the flip cover forming a part of the outer housing of the mobile device.

11. A mobile device and casing as defined in claim 1, wherein the optical filter is incorporated in a window of the flip cover, and wherein the entire window serves for a filtering function of the optical filter.

12. A mobile device and casing as defined in claim 1, wherein the flip cover includes a plastic or glass plate forming a window, and wherein the optical filter is incorporated in a window of the flip cover as one or more filter layers attached to the window.

13. An apparatus comprising a mobile device having a camera, the apparatus further comprising a casing comprising a flip cover, the casing being configured to encase at least a part of the mobile device, the flip cover comprising an optical filter located to enable image capturing by the camera through the optical filter; and a magnet having a strength indicating, to a processing unit of the mobile device, a type of the optical filter.

14. An apparatus as defined in claim 13, wherein the casing is an accessory casing releasably coupled to the mobile device.

15. An apparatus as defined in claim 13, wherein the mobile device has an outer housing, the casing forming a part of the outer housing of the mobile device.

* * * * *